2,744,903

DEHYDROGENATION PROCESS

Fred E. Boettner, Philadelphia, Pa., assignor to Rohm & Haas Company, Philadelphia, Pa., a corporation of Delaware No Drawing. Application February 18, 1953,
Serial No. 337,650

5 Claims. (Cl. 260—290)

This invention relates to a process for preparing methyl pyridines or picolines and lutidines.

There is described in application Serial No. 240,979, filed by Claude J. Schmidle on August 8, 1951, the assignment of which is in the hands of a common assignee, a method for preparing basic nitrogenous compounds by reacting together an olefinically unsaturated hydrocarbon, formaldehyde, and a reactive amino compound, said compound having hydrogen on the nitrogen thereof and said reaction being effected in the presence of an acidic catalyst, such as hydrochloric acid. When this reaction is effected with a primary amine or with ammonia, cyclic compounds tend to form. When isobutylene is the hydrocarbon which is reacted with ammonia and formaldehyde under the influence of hydrochloric acid, there are formed methylenebutylamine and therefrom 6,6-dimethyltetrahydro-1,3-oxazine and also tetrahydropicolines. When ammonia is replaced with methylamine, corresponding N-methyl compounds are formed, including 3,6,6-trimethyltetrahydro-1,3-oxazine and 1,4-dimethyltetrahydro-$\Delta$-3-pyridine.

It has now been found that when reaction mixtures are formed by reacting together isobutylene, formaldehyde, and ammonia or methylamine in the presence of hydrogen chloride, and when they are subjected to dehydrogenating conditions, the basic nitrogen compounds of the reaction mixture are converted to methyl pyridines. The conversion can be accomplished by treating the basic nitrogen compounds in liquid phase with a dehydrogenating catalyst such as copper powder or Raney nickel, temperatures of about 100° to 250° C. being useful here, or by bringing vapors of the reaction mixture in contact with a dehydrogenating catalyst, such as active chromium oxide, vanadium oxide, tungsten oxide, or molybdenum oxide, particularly such an oxide on a support such as activated alumina. For dehydrogenating in this way temperatures between about 250° and 500° C. are suitable.

The class of dehydrogenating catalysts is recognized. Substances used for this purpose must, of course, be non-reactive with the materials brought in contact therewith for purposes of dehydrogenating and separable from the reaction products. The more effective catalysts have extended surfaces. In addition to the catalysts mentioned above there are such materials as copper-alumina, platinum on asbestos, palladium on asbestos, palladium sponge, zinc dust, and the like, and oxides of titanium, thorium or cerium, particularly on a carrier such as alumina, chromic oxide gel, molybdenum sulfide, copper chromite, vanadium oxide on silica, oxides of alkaline earth metals with chromia, usually on alumina, etc.

The theoretical proportions of initial reactants call for one mole of isobutylene, two moles of formaldehyde, and one of ammonia or methylamine. In practice these proportions need not be narrowly adhered to. There may be used, for example, from one to three moles of formaldehyde per mole of ammonia, although a ratio of 2:1 is best. Excess isobutylene, if used, can be recycled.

The proportion of HCl in the reaction mixture is also of interest. Even though on the one hand this substance acts as a catalyst in promoting the reaction of isobutylene, formaldehyde, and ammonia or methylamine, and on the other hand forms a salt with ammonia, methylamine, or basic nitrogenous products in a 1:1 ratio, the ratio of HCl to $NH_3$ (or methylamine) may be varied from 0.35:1 to over 1:1. Optimum results have often been obtained at a 0.75:1 ratio. Yet for convenience a 1:1 ratio is generally used, particularly since this permits use of ammonium chloride or methylamine hydrochloride solution.

The exact order, however, in which reactants and catalyst are brought together is not critical. If desired, ammonia and formaldehyde may be first combined and then supplied, for example, as hexamethylenetetramine, additional formaldehyde being supplied as paraformaldehyde or as aqueous formaldehyde solution. Again, formaldehyde and methylamine may be first combined. These combined forms may then be mixed with isobutylene and hydrochloric acid.

The reaction of isobutylene, formaldehyde, and ammonia or methylamine is carried out between 20° and 125° C., usually under pressure. Unreacted isobutylene is recovered and the basic nitrogen compounds are obtained as water soluble salts. The reaction mixture is made basic with an alkaline reagent and the basic nitrogen compounds are thus free from the solution in the form of an oil.

This oil is now subjected to dehydrogenation. Under the conditions stated above the basic nitrogen compounds are converted principally to methyl pyridines.

Typical preparations of basic nitrogen compounds follow. Parts shown are by weight.

EXAMPLE A

*Reaction of isobutylene, formaldehyde, and ammonia*

An autoclave with a glass liner was charged with 284.2 parts of 95% paraformaldehyde and 300 parts of water. This slurry was stirred until the paraformaldehyde was uniformly suspended. There was then added 160.5 parts of ammonium chloride. The mixture was cooled to 3° C. and 207.5 parts of liquid isobutylene was added. The autoclave containing these materials was sealed. The mixture was stirred and slowly heated to 54° C., the pressure then being 102 p. s. i. At this point reaction was occurring and further heating was discontinued. The temperature rose and when it reached 70° C., cooling was supplied. A peak temperature of 107° C. at 232 p. s. i. was reached. The temperature of the reaction mixture then began to fall and when 91° C. was reached, heating was resumed and the temperature was held below 98° C. for 2.5 hours. During this period the pressure fell from 176 p. s. i. to 131 p s. i. The autoclave was cooled and vented through a chilled trap to recover unreacted isobutylene. The reaction mixture was taken from the autoclave and extracted with 160 parts of ethyl ether. The aqueous layer was treated with aqueous 50% sodium hydroxide solution while the mixture was cooled and kept below 35° C., about 280 parts of this solution being added. A red oil formed an upper layer and was separated. The water layer was extracted with chloroform and the extract was combined with the oil. The oil was dried over anhydrous magnesium sulfate, filtered, and stripped under reduced pressure to give 201.2 parts of a red oil, which was basic in character and contained chiefly cyclic nitrogen compounds. Among these, there have been identified tetrahydro-$\gamma$-picoline, N-methyloltetrahydro-$\gamma$-picoline, N,N'-methylenebis(tetrahydro-$\gamma$-picoline), and dimethyltetrahydro-1,3-oxazine.

EXAMPLE B

*Reaction of isobutylene, formaldehyde, and methylamine*

The procedure used in Example A was followed with 180 parts of paraformaldehyde, 244.5 parts of methylamine hydrochloride in a 25% aqueous solution, and 202 parts of isobutylene. The heat of reaction carried the temperature to 105° C. at 260 p. s. i. Heating was continued at 90°–98° C. for four hours. There was an uptake of 162 parts of isobutylene. From the reaction mixture there was obtained as a product an oil amounting to 273 parts and containing basic nitrogen compounds, chiefly cyclical in nature. These were found to include 1,4-dimethyl-1,2,3,6-tetrahydropyridine and 3,6,6-trimethyltetrahydro-1,3-oxazine. There were also found N-methyl-N-hydroxymethyl-3-methylbutylamine and N-methyl-N-hydroxymethyl-3-methylenebutylamine.

Typical procedures for dehydrogenation are described in the following illustrative examples.

EXAMPLE 1

A column was packed with a commercial chrome-alumina dehydrogenation catalyst in granular form to a depth of 53 cm. The column was provided with means for heating electrically and was well jacketed. A thermocouple was placed within the column. At the top of this column there was mounted a device for slowly admitting basic reaction products. The lower end of the column was connected to an ice-cooled receiving vessel, which was in turn connected to another vessel carrying a reflux condenser, the latter vessel being surrounded with a bath containing Dry Ice and acetone.

The column was flushed with nitrogen and heated to 475° C. With a gentle flow of nitrogen there was then dropped into the top of the column 201 parts of the oily product obtained by reacting together isobutylene, formaldehyde, and ammonia as above. There was collected in the ice-cooled vessel 116 parts of material which formed two layers. The second vessel contained 45 parts of isobutylene. Isobutylene was evaporated from the ice-cooled vessel and the two layers were separated with the aid of ethyl ether. The aqueous layer was extracted with ether and the extract was combined with the main organic layer. The ether solution was then dried over potassium hydroxide, filtered and distilled. After a small forerun several fractions were taken between 50° and 100° C. at about 25 mm. About 16 parts of residue was obtained. These fractions were combined and redistilled at 46°–56° C./24 mm. There was obtained a fraction of 47 parts which approached in composition to $\gamma$-picoline, a yield of 22%. A picrate was formed from the product. It melted at 162°–164° C. A mixed melting point with an authentic sample of the picrate of $\gamma$-picoline was likewise 162°–164° C.

EXAMPLE 2

There were reacted ammonia, formaldehyde (from paraformaldehyde), and isobutylene in a mole ratio at 1:2:1.11 with HCl being present in a ratio of one mole per mole of ammonia. The reaction time was four hours and the maximum temperature reached was 120° C. at 281 p. s. i. Reaction products were separated as above. They were added to the dehydrogenation column over a 3.5 hour period with the temperature at 350°–360° C. The dehydrogenation products were fractionated as above with a yield of 48 parts of $\gamma$-picoline from 189 parts of crude condensation products. There were recovered isobutylene and tert.-butyl alcohol. Some diisobutylene was found.

EXAMPLE 3

The above reaction was carried out with a 1:2:1.3 mole ratio of ammonia, formaldehyde, and isobutylene and with a ratio of HCl/NH$_3$ of 0.75. Reaction time was 3.5 hours with a maximum temperature of 99° C.

The basic nitrogen products were added to the dehydrogenating column at 350°–360° C. over 5.5 hours. When the reaction mixture was worked up, there were obtained from 238 parts of crude condensation product 56 parts of $\gamma$-picoline, a yield of 37% with allowance for recovered isobutylene.

EXAMPLE 4

The above procedures were repeated starting with ammonia, formaldehyde, and isobutylene in a 1:2:1.1 mole ratio with a 0.5/1 ratio for HCl/NH$_3$. The crude condensation products were dehydrogenated at 400°–410° C. over 9.5 hours with a yield of 31.6%.

EXAMPLE 5

The procedures used above were followed, but the dehydrogenation column was packed with "Type B" catalyst, a chromia-calcium-nickel-phosphate dehydrogenation catalyst. From 297 parts of crude condensation products heated on the catalyst at 330°–380° C. there was obtained a crude yield of 133 parts, from which there were obtained on distillation and fractionation 54 parts of $\gamma$-picoline.

EXAMPLE 6

The above procedures were again followed, but with the column packed with a commercial catalyst having molybdenum oxide on alumina. Dehydrogenation temperatures of 350°–375° C. were used. From 295 parts of crude condensation products there were obtained 147 parts of dehydrogenation products and therefrom 90 parts of $\gamma$-picoline.

EXAMPLE 7

There were condensed as above 3 gram moles of methylamine hydrochloride, 6 gram moles of formaldehyde, and 3.75 gram moles of isobutylene over a period of four hours with the maximum temperature of 108° C. at 214 p. s. i. There was obtained a basic condensation product amounting to 245 grams. This product was dehydrogenated on the chromia-alumina catalyst at 360°–375° C. There was obtained a fraction consisting of $\gamma$-picoline and 2,4-lutidine in a yield of 36%. The formation of $\gamma$-picoline is apparently due to demethylation during the migration of the methyl group from the crude condensation products which contain 1,4-dimethyltetrahydropyridine, 1,4,4-trimethyltetrahydro-1,3-oxazine, and other amines.

EXAMPLE 8

There were mixed 25 parts by weight of copper powder and 272 parts by weight of the condensation product from ammonium chloride, formaldehyde, and isobutylene, condensed in a 1:2:1 mole ratio. The mixture was stirred and heated under reflux for four hours. During this time the pot temperature rose from 50° to 174° C. while the vapor temperature rose to 146° C. No attempt was made to collect isobutylene given off. The reaction mixture was allowed to cool while it stood for 16 hours. It was then fractionally distilled. After a small forerun there were collected 45 parts of $\gamma$-picoline between 80° and 115° C. at 47 to 60 mm.

EXAMPLE 9

In a similar way 194 parts by weight of the condensation product from ammonium chloride, formaldehyde, and isobutylene, 20 parts of Raney nickel in isooctane, and 386 parts of toluene were mixed. The mixture was stirred and heated under reflux for 5.5 hours, a stream of nitrogen being passed over the mixture. The reaction system was cooled. The toluene layer was decanted. The residual oil was stirred with boiling toluene and decanted. The toluene layers were collected, filtered, and distilled. After the toluene had been taken off, a fraction of $\gamma$-picoline was obtained amounting to 24 parts.

I claim:

1. A process for preparing methyl pyridines which comprises heating between 100° and 500° C. in the presence of a dehydrogenating catalyst the basic condensation products of isobutylene, formaldehyde, and a member of the class consisting of ammonia and methylamine, said products being formed in the presence of hydrogen chloride.

2. A process for preparing methyl pyridines which comprises heating in the presence of a dehydrogenating catalyst between 250° and 500° C. the basic condensation products of isobutylene, formaldehyde, and ammonia formed in the presence of hydrogen chloride.

3. The process of claim 2 in which the dehydrogenation catalyst is composed of chromium oxide on alumina.

4. A process for preparing methyl pyridines which comprises heating in the presence of a dehydrogenating catalyst between 250° and 500° C. the basic condensation products of isobutylene, formaldehyde, and methylamine formed in the presence of hydrogen chloride.

5. The process of claim 4 in which the dehydrogenation catalyst is composed of chromium oxide on alumina.

References Cited in the file of this patent

UNITED STATES PATENTS

| | | |
|---|---|---|
| 2,019,883 | Wulff et al. | Nov. 5, 1935 |
| 2,184,235 | Groll et al. | Dec. 19, 1939 |
| 2,300,971 | Roberts et al. | Nov. 31, 1942 |
| 2,647,117 | Hartough et al. | July 28, 1953 |

OTHER REFERENCES

Morton: "The Chem. of Heterocyclic Compounds" (1946), pp. 190–91.